(12) United States Patent
Lieberman et al.

(10) Patent No.: US 10,728,342 B1
(45) Date of Patent: Jul. 28, 2020

(54) PLUG AND PLAY MULTI TENANCY SUPPORT FOR CLOUD APPLICATIONS

(71) Applicant: EMC Corporation, Hopkinton, MA (US)

(72) Inventors: Amit Lieberman, Kfar Saba (IL); Senya Touretski, Ramat Gan (IL); Meytal Ashkenazy, Netanya (IL); Idan Levyl, Kadima Zoran (IL); Shai Harmelin, Haifa (IL)

(73) Assignee: EMP IP HOLDING COMPANY LLC, Hopkinton, MA (US)

( * ) Notice: Subject to any disclaimer, the term of this patent is extended or adjusted under 35 U.S.C. 154(b) by 179 days.

(21) Appl. No.: 15/198,227

(22) Filed: Jun. 30, 2016

(51) Int. Cl.
*H04L 29/08* (2006.01)
*H04L 29/06* (2006.01)
*G06F 16/21* (2019.01)
*G06F 16/25* (2019.01)

(52) U.S. Cl.
CPC .......... *H04L 67/141* (2013.01); *G06F 16/211* (2019.01); *G06F 16/252* (2019.01); *H04L 63/08* (2013.01); *H04L 67/02* (2013.01); *H04L 67/10* (2013.01)

(58) Field of Classification Search
CPC .......... G06F 17/30292; G06F 17/3056; G06F 16/211; G06F 16/252; H04L 63/08; H04L 67/02; H04L 67/10; H04L 67/141
See application file for complete search history.

(56) References Cited

U.S. PATENT DOCUMENTS

| | | | |
|---|---|---|---|
| 2009/0150502 A1* | 6/2009 | Pallamreddy | H04L 67/26 709/206 |
| 2010/0023937 A1* | 1/2010 | Kothari | G06F 9/44505 717/170 |
| 2014/0075565 A1* | 3/2014 | Srinivasan | G06Q 10/06315 726/26 |
| 2014/0330869 A1* | 11/2014 | Factor | G06F 21/6218 707/783 |
| 2015/0146736 A1* | 5/2015 | Kawai | H04L 12/4633 370/400 |
| 2016/0125177 A1* | 5/2016 | Kashiyama | G06F 21/31 726/10 |
| 2017/0177625 A1* | 6/2017 | Lam | G06F 16/24553 |

\* cited by examiner

*Primary Examiner* — Gil H. Lee
(74) *Attorney, Agent, or Firm* — Womble Bond Dickinson (US) LLP

(57) ABSTRACT

One embodiment is related to a method for setting a tenant context for an application in a multi-tenancy environment, comprising: identifying a tenant identity for a tenant request, wherein the tenant identity is included in the tenant request; and setting a proper context for a first service of the application based on the identified tenant identity.

12 Claims, 5 Drawing Sheets

PLUG AND PLAY MULTI TENANCY SUPPORT FOR CLOUD APPLICATIONS

FIELD OF THE INVENTION

The disclosure relates generally to cloud applications and more particularly to the multi-tenancy architecture of cloud applications.

BACKGROUND

Multi-tenancy is an architecture in which a single instance or a load-balanced farm of identical instances of a software application serves multiple customers. Each customer is referred to as a tenant. Each tenant's data is isolated and invisible to other tenants. Multi-tenancy can be economical because software development and maintenance costs are shared.

Deploying a software application that supports multi-tenancy comes with its own challenges. The application architecture needs to be adapted to cope with multi-tenancy requirements. Compared to traditional n-tier deployments where each customer installs its own services and storage, a cloud application that supports multi-tenancy leverages the benefits of shared resources to maximize the resources throughout all customers. Therefore, application components and databases need to be changed in order to support multi-tenancy.

In many scenarios, due to customer limitations relating to the "cloud offering," two versions of a same software application need to be developed and maintained, one designed for the on-premises architecture without multi-tenancy features, and the other with multi-tenancy features. This leads to increased development and maintenance costs for service providers.

Moreover, while some components like databases and messaging systems have introduced support for multi-tenancy abstractions, manual set-up and coordination is still required to enable a software application to support multi-tenancy.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1B:
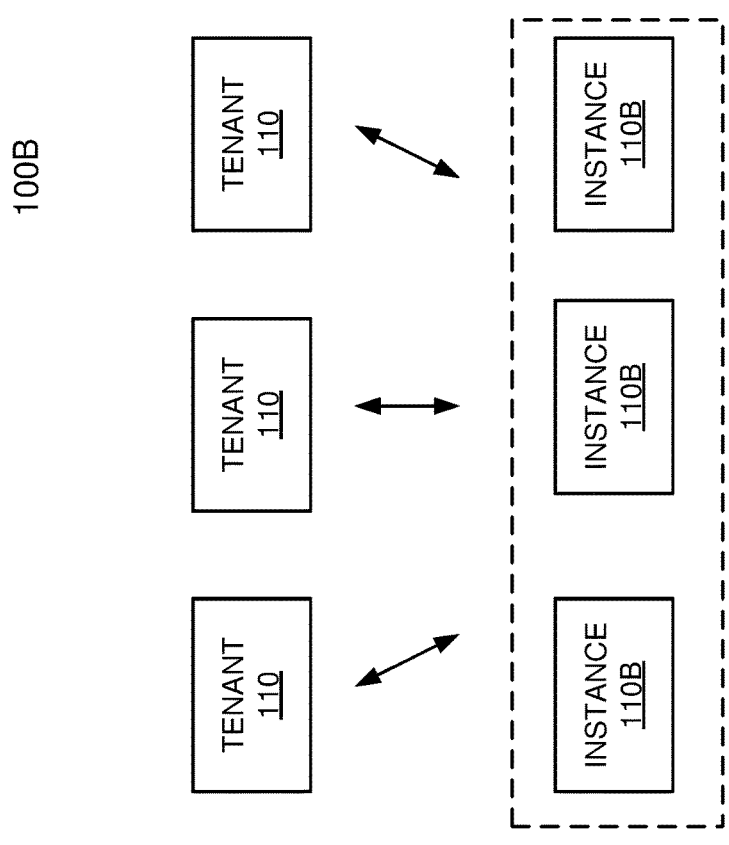
FIGS. 1A and 1B are diagrams illustrating example multi-tenancy architectures according to one embodiment of the invention.
Figure 1A:
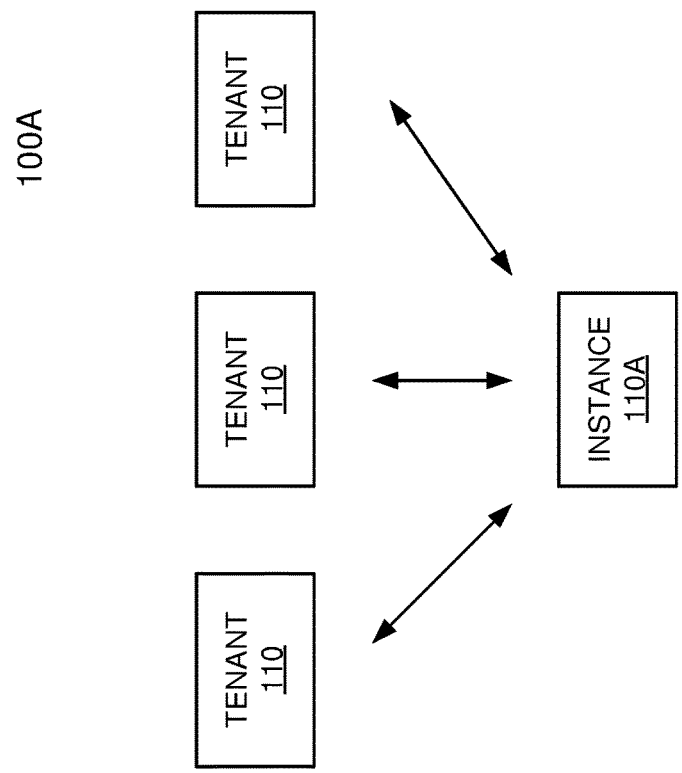

Referring to FIGS. 1A and 1B, diagrams illustrating example multi-tenancy architectures 100A, 100B according to one embodiment of the invention are shown. In the multi-tenancy architecture 100A, a plurality of tenants 110 are served by a single instance 120A of a software application. Metadata may be configurable for different tenants to provide customized user experience and feature set for each tenant. Authorization and security policies ensure that each tenant's data is kept separate from that of other tenants. In the multi-tenancy architecture 100B, a plurality of tenants 110 are served by a load-balanced farm of identical instances 120B, with each tenant's data kept separate.

In many scenarios, due to customer limitations relating to the "cloud offering," two versions of a same software application need to be developed and maintained, one designed for the on-premises architecture without multi-tenancy features, and the other with multi-tenancy features. This leads to increased development and maintenance costs for service providers.

Moreover, while some components such as databases and messaging systems have introduced support for multi-tenancy abstractions, manual set-up and coordination is still required to enable a software application to support multi-tenancy.

Embodiments of the disclosure relate to a method, apparatus, and system for injecting multi-tenancy capabilities into software applications that are not multi-tenancy-aware with a multi-tenancy support module without requiring significant modifications to the applications themselves. In particular, communication and data storage/retrieval protocols used by services of an application may be hooked into by the multi-tenancy support module. A proper tenant context may be set by the multi-tenancy support module for each communication and data storage/retrieval operation to prevent data belonging to different tenants from commingling. The supported communication and data storage/retrieval protocols may include one or more of the following: 1) relational databases, 2) Hypertext Transfer Protocol (HTTP) Representational State Transfer (REST) calls, 3) messaging protocols (e.g., Java Message Service "JMS," Advanced Message Queuing Protocol "AMQP," etc.), 4) key value stores (e.g., Amazon S3 "Simple Storage Service", etc.), and 5) in-memory database caching services (e.g., Redis, Memcached, etc.). The above list is illustrative and does not limit the disclosure. Support for still further communication and/or data storage/retrieval protocols may be added without deviating from the disclosure.

An authentication module at the entry point of the application may be implemented. At the beginning of an access session, a tenant may authenticate herself through the authentication module, and if the authentication is successful, the tenant identity is associated with the access session.

Thereafter, the application may include the tenant identity inside each tenant request within the access session. A tenant request may comprise any inter-service communication between the abovementioned supported services or protocols. When the tenant request comprises an HTTP message, the tenant identity may be included as an HTTP header.

Figure 2:
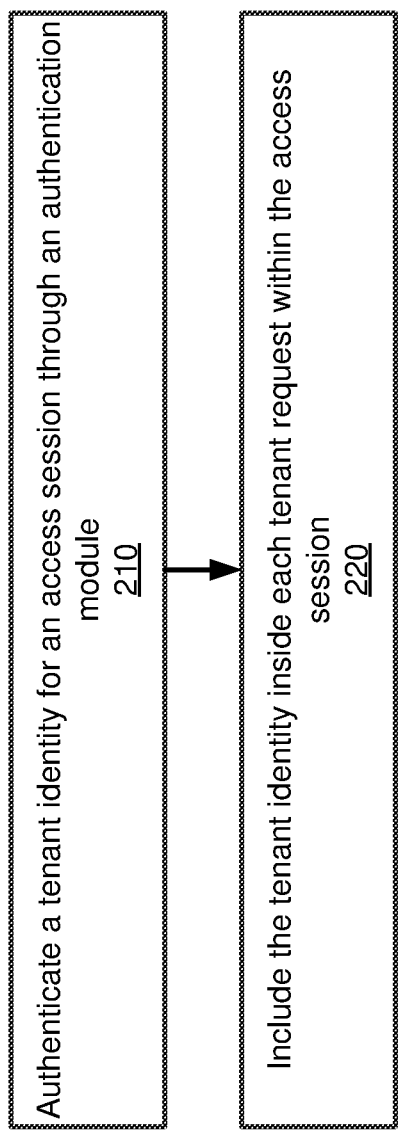
FIG. 2 is a flowchart illustrating an example method for associating a tenant access request with a tenant identity according to one embodiment of the invention.

Referring to FIG. 2, a flowchart illustrating an example method 200 for associating a tenant access request with a tenant identity according to one embodiment of the invention is shown. Operations of the method 200 may be performed by an application that has been properly adapted according to embodiments of the disclosure. At block 210, a tenant identity for an access session may be authenticated through an authentication module. At block 220, the tenant identity may be included inside each tenant request within the access session. When the tenant request comprises an HTTP message, the tenant identity may be included as an HTTP header.

As each tenant request is associated with a tenant identity, a proper tenant context may be set for the request by the multi-tenancy support module based on the tenant identity. The setting of the proper tenant context may comprise such operations as returning a correct database connection comprising the database server instance and database schema associated with the tenant identity, or returning a correct key value store connection comprising the key value store bucket and key value store schema associated with the tenant identity. When services within the application communicate with each other with a messaging protocol, the tenant context may be passed from the source service to the destination service by the multi-tenancy support module embedding the tenant identity in the message at the source service sending the message, and recovering the tenant identity at the destination service receiving the message. The proper tenant context may be set for the destination service by the multi-tenancy support module based on the recovered tenant identity.

Figure 3:
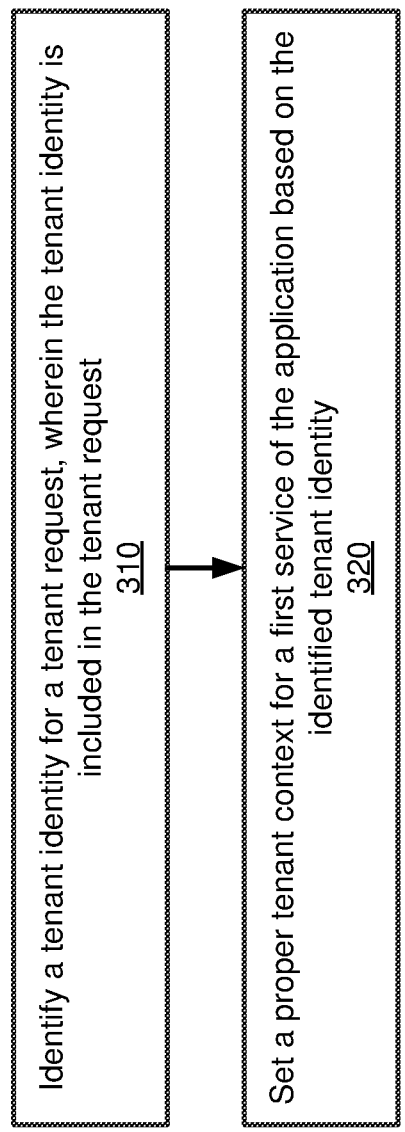
FIG. 3 is a flowchart illustrating an example method for setting a proper tenant context in a multi-tenancy environment according to one embodiment of the invention.

Referring to FIG. 3, a flowchart illustrating an example method 300 for setting a proper tenant context for an application in a multi-tenancy environment according to one embodiment of the invention is shown. The operations of the method 300 may be performed by a multi-tenancy support module, which may be implemented in hardware or in a combination of hardware, such as processor 1501 of FIG. 5, and software residing in e.g., computer-readable medium 1509 and/or memory 1503 of FIG. 5. At block 310, a tenant identity may be identified for a tenant request, wherein the tenant identity is included in the tenant request. When the tenant request comprises an HTTP message, the tenant identity may be included as an HTTP header. At block 320, a proper tenant context may be set for a first service of the application based on the identified tenant identity. Further, in response to the first service transmitting a message to a second service using a messaging protocol, the proper tenant context may be passed to the second service by the multi-tenancy support module. The passing of the proper tenant context may comprise including the tenant identity in the message at the first service, recovering the tenant identity from the message at the second service, and setting the proper tenant context for the second service based on the recovered tenant identity.

Methods 300 and 400 may be performed by processing logic that includes hardware (e.g. circuitry, dedicated logic, etc.), software (e.g., embodied on a non-transitory computer readable medium), or a combination thereof. For example, methods 300 and 400 may be performed by processor 1501 of FIG. 5. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
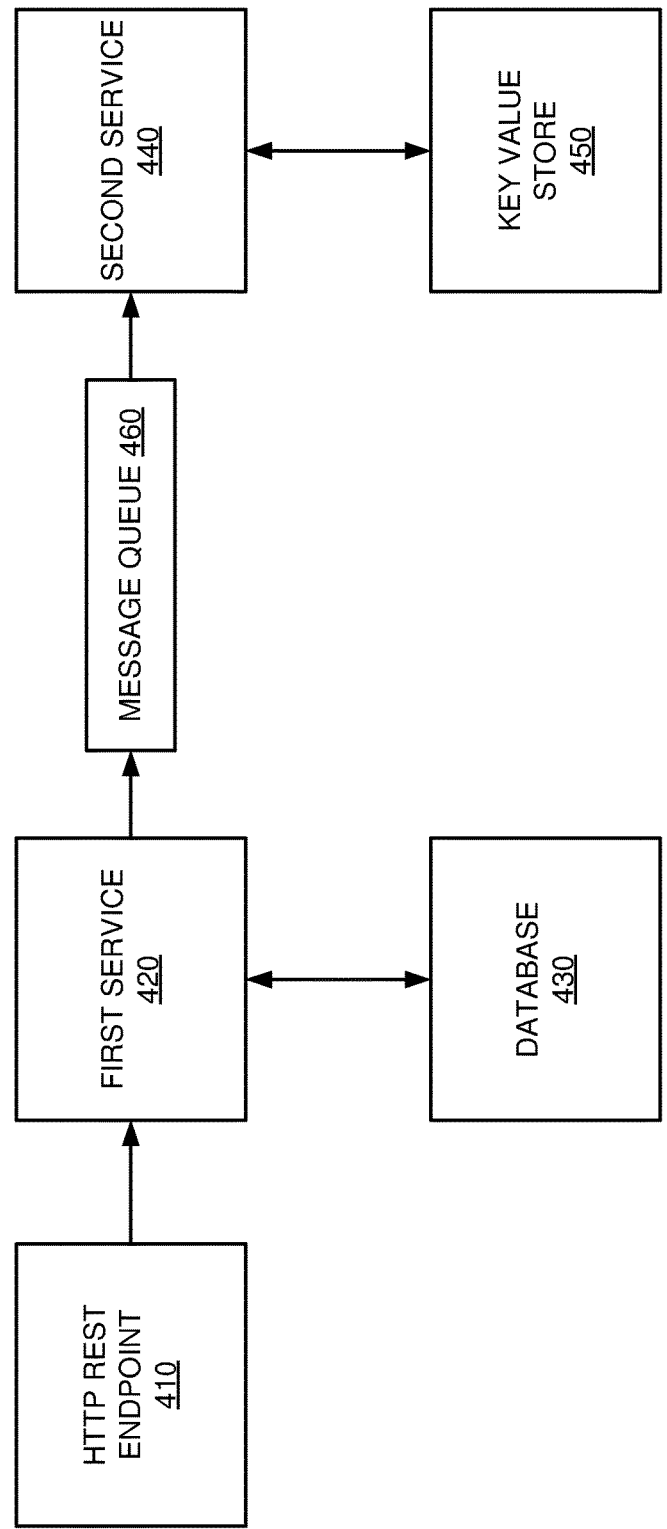
FIG. 4 is a block diagram illustrating example operations according to one embodiment of the invention.

Referring to FIG. 4, a block diagram 400 illustrating example operations according to one embodiment of the invention is shown. At HTTP REST endpoint 410, the tenant identity may be added to tenant requests associated with a successfully authenticated access session by including the tenant identity inside the tenant requests as an HTTP header. The included tenant identity may be identified within the tenant request by the multi-tenancy support module after the HTTP REST endpoint 410. For example, at the first service 420, the tenant identity may be identified by the multi-tenancy support module and a proper tenant context may be set for the first service 420. The setting of the proper tenant context for the first service 420 may include returning to the first service 420 a correct database 430 connection comprising the database server instance and database schema associated with the tenant identity. Therefore, multiple database servers and multiple database schemas may be leveraged within this multi-tenancy environment to allow the best utilization of resources.

When the first service 420 transmits a message associated with a tenant request to a second service 440 through a message queue 460 by utilizing a messaging protocol, the tenant context may also be passed by the multi-tenancy support module from the first service 420 to the second service 440. At the first service 420 (e.g., the source service), the tenant identity may be added by the multi-tenancy support module to the message (e.g., as a header). At the second service 440, the tenant identity may be recovered from the message by the multi-tenancy support module and the proper tenant context may be set for the second service 440. Setting the proper tenant context for the second service 440 may comprise returning to the second service 440 a correct key value store 450 connection comprising the key value store bucket and key value store schema associated with the tenant identity.

Figure 5:
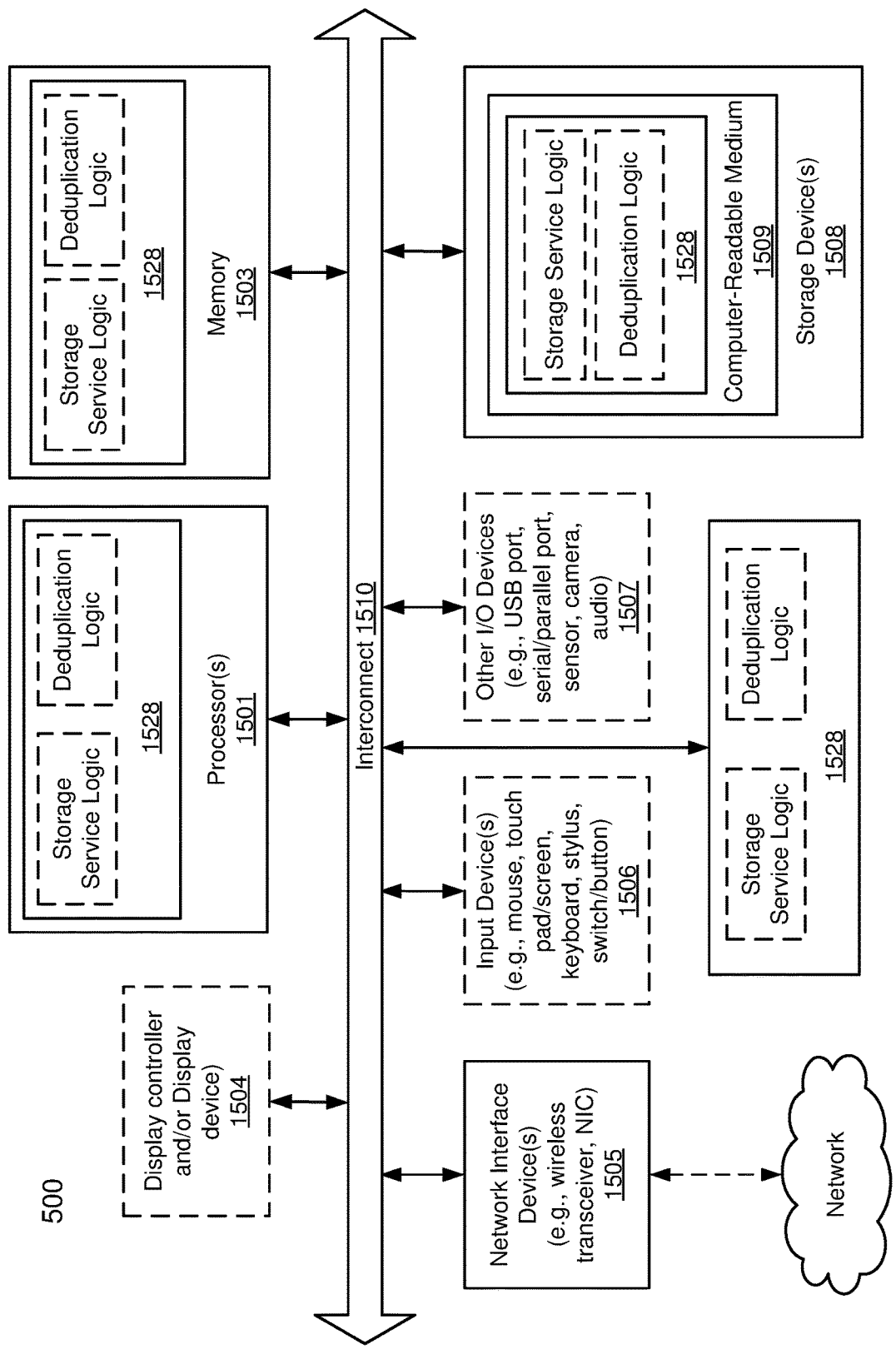
FIG. 5 is a block diagram illustrating an example data processing system according to one embodiment of the invention.

FIG. 5 is a block diagram illustrating an example data processing system 500 according to one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

One embodiment of the disclosure is related to a data processing system, comprising: a processor; and a memory coupled to the processor storing instructions which, when executed by the processor, cause the processor to perform support operations, the operations including: identifying a tenant identity for a tenant request in a multi-tenancy environment, wherein the tenant identity is included in the tenant request; and setting a proper context for a first service of an application based on the identified tenant identity.

Therefore, with embodiments of the disclosure comprising a multi-tenancy support module, an application do not need to be aware of the tenant-to-resource mapping. As a result, complexity of the application may be reduced. Further, same service binaries may be used for both multi-tenancy and on-premises installations. The services may be tested without the complexity of tenant management. Data may be moved between different resources (e.g., servers, schemas, buckets, etc.) with tenant management tools to balance resource consumption. Moreover, the possibility of data leaks between tenants due to errors in application development may be reduced.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for setting a tenant context for an application in a multi-tenancy environment, comprising:
    identifying, by a multitenancy support module, a tenant identity of a tenant for a tenant request subsequent to a successful authentication of the tenant, wherein the tenant identity is included in the tenant request;
    setting, by the multitenancy support module, a tenant context for a first service of the application based on the identified tenant identity, wherein the application is not multitenancy-aware, wherein communication and data storage/retrieval protocols, including relational databases and in-memory database caching services, used by the first service of the application are hooked into by the multitenancy support module, and wherein the setting of the tenant context for the first service of the application comprises returning a database connection comprising a database server instance and a database schema associated with the tenant identity, wherein the setting of the tenant context for the first service further comprises returning to the first service a key value store connection comprising a key value store bucket and a key value store schema associated with the tenant identity; and in response to the first service of the application transmitting a message to a second service of the application using a messaging protocol, passing, by the multi-tenancy support module, the tenant context to the second service from the first service, wherein passing the tenant context further comprises: adding, by the multi-tenancy support module, the tenant identity to the message as a header at the first service, and recovering, by the multi-tenancy support module, the tenant identity from message at the second service.

2. The method of claim 1, wherein the tenant request comprises a hypertext transfer protocol (HTTP) message, and the tenant identity is included in the tenant request as an HTTP header.

3. The method of claim 1, wherein the messaging protocol comprises at least one of Java Message Service (JMS) or Advanced Message Queuing Protocol (AMQP).

4. The method of claim 1, wherein the passing of the tenant context to the second service of the application further comprises:
setting the tenant context for the second service based on the recovered tenant identity, wherein the key value store connection includes Amazon S3 "Simple Storage Service".

5. A non-transitory machine-readable medium having instructions stored therein which, when executed by a processor, cause the processor to perform support operations, the operations comprising:
identifying, by a multitenancy support module, a tenant identity of a tenant for a tenant request within a multi-tenancy environment subsequent to a successful authentication of the tenant, wherein the tenant identity is included in the tenant request;
setting, by the multitenancy support module, a tenant context for a first service of an application based on the identified tenant identity, wherein the application is not multitenancy-aware, wherein communication and data storage/retrieval protocols, including relational databases and in-memory database caching services, used by the first service of the application are hooked into by the multitenancy support module, and wherein the setting of the tenant context for the first service of the application comprises returning a database connection comprising a database server instance and a database schema associated with the tenant identity, wherein the setting of the tenant context for the first service further comprises returning to the first service a key value store connection comprising a key value store bucket and a key value store schema associated with the tenant identity; and
in response to the first service of the application transmitting a message to a second service of the application using a messaging protocol, passing, by the multi-tenancy support module, the tenant context to the second service from the first service, wherein passing the tenant context further comprises: adding, by the multi-tenancy support module, the tenant identity to the message as a header at the first service; and recovering, by the multi-tenancy support module, the tenant identity from message at the second service.

6. The non-transitory machine-readable medium of claim 5, wherein the tenant request comprises a hypertext transfer protocol (HTTP) message, and the tenant identity is included in the tenant request as an HTTP header.

7. The non-transitory machine-readable medium of claim 5, wherein the messaging protocol comprises at least one of Java Message Service (JMS) or Advanced Message Queuing Protocol (AMQP).

8. The non-transitory machine-readable medium of claim 5, wherein the passing of the tenant context to the second service of the application further comprises:
setting the tenant context for the second service based on the recovered tenant identity, wherein the key value store connection includes Amazon S3 "Simple Storage Service".

9. A data processing system, comprising:
a processor; and
a memory coupled to the processor storing instructions which, when executed by the processor, cause the processor to perform support operations, the operations including
identifying, by a multitenancy support module, a tenant identity of a tenant for a tenant request within a multi-tenancy environment subsequent to a successful authentication of the tenant, wherein the tenant identity is included in the tenant request;
setting, by the multitenancy support module, a tenant context for a first service of an application based on the identified tenant identity, wherein the application is not multitenancy-aware, wherein communication and data storage/retrieval protocols, including relational databases and in-memory database caching services, used by the first service of the application are hooked into by the multitenancy support module, and wherein the setting of the tenant context for the first service of the application comprises returning a database connection comprising a database server instance and a database schema associated with the tenant identity, wherein the setting of the tenant context for the first service further comprises returning to the first service a key value store connection comprising a key value store bucket and a key value store schema associated with the tenant identity; and
in response to the first service of the application transmitting a message to a second service of the application using a messaging protocol, passing, by the multi-tenancy support module, the tenant context to the second service from the first service, wherein passing the tenant context further comprises: adding, by the multi-tenancy support module, the tenant identity to the message as a header at the first service; and recovering, by the multi-tenancy support module, the tenant identity from message at the second service.

10. The data processing system of claim 9, wherein the tenant request comprises a hypertext transfer protocol (HTTP) message, and the tenant identity is included in the tenant request as an HTTP header.

11. The data processing system of claim 9, wherein the messaging protocol comprises at least one of Java Message Service (JMS) or Advanced Message Queuing Protocol (AMQP).

12. The data processing system of claim 9, wherein the passing of the tenant context to the second service of the application further comprises:

setting the tenant context for the second service based on the recovered tenant identity, wherein the key value store connection includes Amazon S3 "Simple Storage Service".

* * * * *